(12) United States Patent
Shetty et al.

(10) Patent No.: US 12,704,990 B2
(45) Date of Patent: Aug. 11, 2026

(54) SYSTEMS AND METHODS TO REDUCE APPLICATION INPUT/OUTPUT RESUMPTION TIME DUE TO A FAILURE OF A STORAGE SITE OR A NETWORK PARTITION WITHIN A CROSS-SITE STORAGE SYSTEM

(71) Applicant: NetApp, Inc., San Jose, CA (US)

(72) Inventors: Sohan Shetty, Bangalore (IN); Akhil Kaushik, San Jose, CA (US); Anoop Vijayan, Bangalore (IN); Rohit Chaudhary, Uttar Pradesh (IN); Sunil Parmar, Madhya Pradesh (IN)

(73) Assignee: NetApp, Inc., San Jose, CA (US)

( * ) Notice: Subject to any disclaimer, the term of this patent is extended or adjusted under 35 U.S.C. 154(b) by 95 days.

(21) Appl. No.: 18/785,801

(22) Filed: Jul. 26, 2024

(65) Prior Publication Data

US 2026/0029945 A1 Jan. 29, 2026

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01)

(58) Field of Classification Search
CPC ......... G06F 3/065; G06F 3/0604; G06F 3/067
See application file for complete search history.

(56) References Cited

U.S. PATENT DOCUMENTS

2022/0317897 A1* 10/2022 Subramanian ........ G06F 3/0689
2022/0318107 A1* 10/2022 Kaushik ................ G06F 3/0619
2024/0036732 A1* 2/2024 Vijayan ................. G06F 3/0611
2024/0126783 A1* 4/2024 Wong .................. G06F 16/2379

* cited by examiner

*Primary Examiner* — Jason W Blust
(74) *Attorney, Agent, or Firm* — Jaffery Watson Hamilton & DeSanctis LLP

(57) ABSTRACT

A computer-implemented method includes establishing bi-directional synchronous replication between one or more members of a first consistency group (CG1) of a primary storage site and one or more members of a second consistency group (CG2) of a secondary storage site with each storage site having read/write access. The method includes detecting a disruption in a data replication session from one or more members of the CG1 to one or more members of the CG2 due to a disaster event, initiating a consensus establishment request to be sent to a mediator agent of the primary storage site, rejecting with the mediator agent the consensus establishment request, and initiating a role flip process for primary and secondary roles in serving I/O Operations in response to the rejection of the consensus establishment request to reduce an application input/output (I/O) resumption time due to the disaster event.

7 Claims, 14 Drawing Sheets

SYSTEMS AND METHODS TO REDUCE APPLICATION INPUT/OUTPUT RESUMPTION TIME DUE TO A FAILURE OF A STORAGE SITE OR A NETWORK PARTITION WITHIN A CROSS-SITE STORAGE SYSTEM

FIELD

Various embodiments of the present disclosure generally relate to dual copy multi-site distributed data storage systems. In particular, some embodiments relate to systems and methods to reduce resumption time of application input/output (I/O) operations given recovery of a primary storage site, failure of a secondary storage site, or a network partition between the primary and secondary storage sites of the dual copy multi-site distributed data storage systems.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. A fully symmetric storage solution allows simultaneous read-write access to both a primary copy and a secondary copy of the data. For a disaster event on a primary storage site, an unplanned failover is triggered to activate the surviving secondary storage site which takes over a role of primary for serving input/output (I/O) operations. Eventually when the disaster-stricken primary storage site is recovered, the primary storage site boots up with the last known role as primary and there is a process of contention to resolve the "split brain" scenario where both primary and secondary storage sites contend to have the primary role of serving I/O operations. However, until this contention is resolved, the I/O Ops will face a transition error causing I/O latency impact.

SUMMARY

In one example, the present storage solution provides an order of operations of a computer-implemented method that includes establishing bi-directional synchronous replication between one or more members of a first consistency group (CG1) of a primary storage site and one or more members of a second consistency group (CG2) of a secondary storage site with each storage site having read/write access. The method includes detecting a disruption in a data replication session from one or more members of the CG1 to one or more members of the CG2 due to a disaster event, initiating a consensus establishment request to be sent to a mediator agent of the primary storage site, rejecting with the mediator agent the consensus establishment request, and initiating a role flip process for primary and secondary roles in serving I/O Operations in response to the rejection of the consensus establishment request to reduce an application input/output (I/O) resumption time due to the disaster event in accordance with some embodiments.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
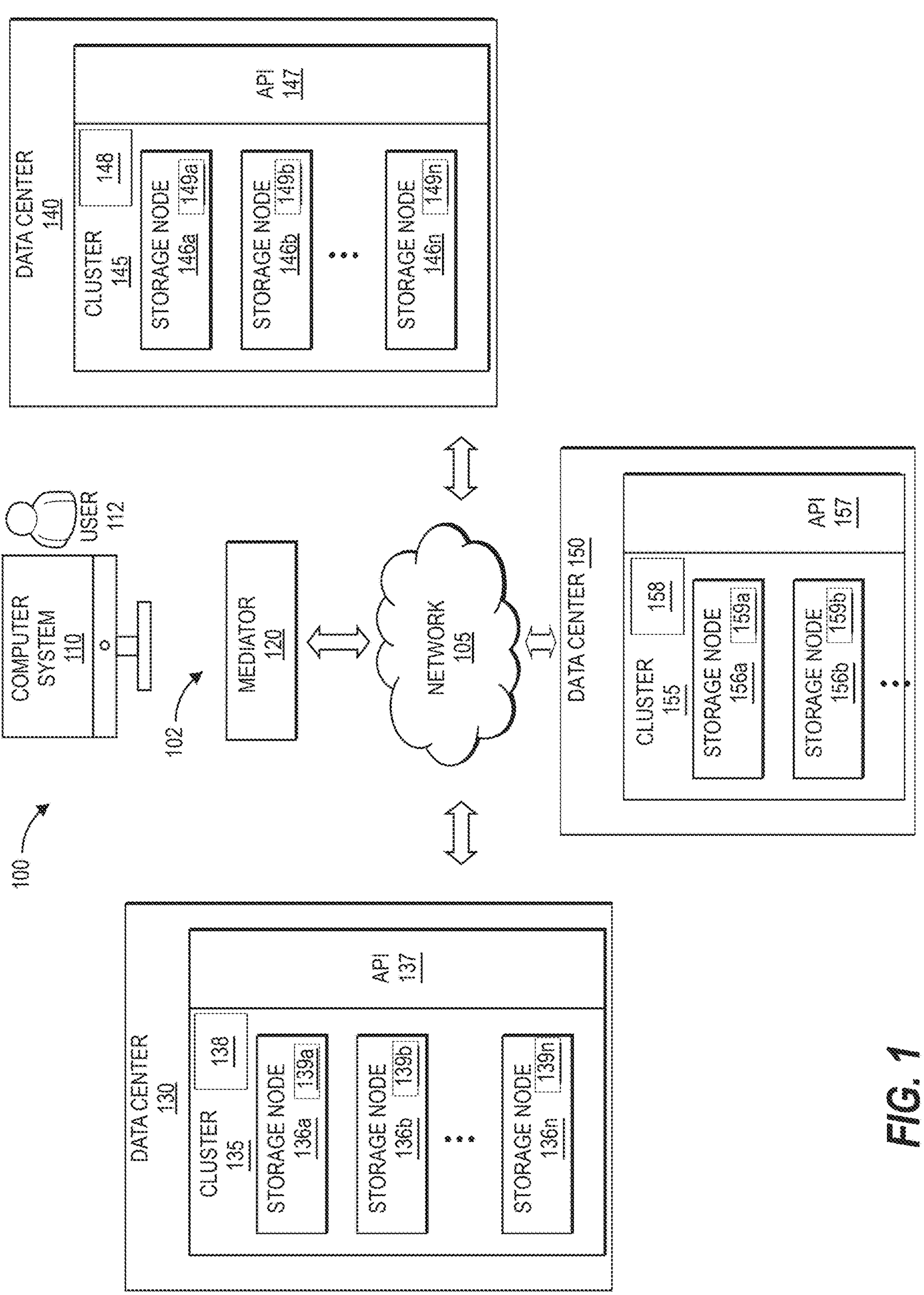
FIG. 1 is a block diagram illustrating an environment in which various embodiments may be implemented.

Systems and methods are described for a fully symmetric storage solution that allows simultaneous read-write access to both a primary copy and a secondary copy of data. The fully symmetric storage solution provides application-granular zero recovery point objective (ZRPO) data protection that prevents any data loss and zero recovery time objective (ZRTO) transparent failover that provides instant recovery in the event of various potential faults for a primary storage site, a secondary storage site, and communication links between the primary and secondary storage sites.

Concurrent read/write access to both copies in a symmetric Active/Active storage system is facilitated by bi-directional synchronous replication. This means that any write operation (WRITE op) initiated on a primary copy of a primary storage site is synchronously replicated to the secondary copy on a secondary storage site before a client receives an acknowledgment (ACK). Similarly, a WRITE op initiated on secondary copy is synchronously replicated to the primary copy before the client receives an ACK. This bi-directional sync replication ensures that both copies are always up-to-date and consistent with each other.

Despite the advantages of bi-directional synchronous replication in a symmetric Active/Active system, this storage solution presents challenges due to a disaster event for recovery of a primary storage site, recovery of a secondary storage site, or a network partition between the primary and secondary storage sites of the dual copy multi-site distributed data storage systems.

In one example, the primary storage site and secondary storage site are located in relatively close proximity (e.g., less than 100 km, proximity based on round trip time guarantees for synchronous replication datasets) and a tertiary storage site is located at a greater distance. In another example, one or more of the storage sites (e.g., one storage site, two storage sites, three storage sites) can be located in a private or public cloud, accessible (e.g., via a web portal) to an administrator associated with a managed service provider and/or administrators of one or more customers of the managed service provider, includes a cloud-based, monitoring system provided that network connectivity is suitable for synchronous replication between the two synchronous replicated copies. Furthermore, other combinations for the storage sites are possible, for example, one storage site on premise and two storage sites in the cloud and other such variants. The three site topology is applicable to cloud-resident workloads and datasets as well. For a fully cloud resident dataset, two sites can be in the same region (e.g., same availability zone (AZ) or different AZs with sync replication being a limit to a distance between the two sites) and the third site can be in a different region (e.g., a long distance dataset copy) or even an on premise data center. Availability zones (AZs) are isolated data centers located within specific regions in which public cloud services originate and operate. Cloud computing businesses typically have multiple worldwide availability zones. A cloud-resident workload is an application, service, capability, or a specified amount of work that consumes cloud-based resources (e.g., computing or memory power). Databases, containers, microservices, VMs, and Hadoop nodes are examples of cloud workloads.

In one embodiment, cross-site high availability is a valuable addition to cross-site zero recover point objective (RPO) that provides non-disruptive operations even if an entire local data center becomes non-functional based on a seamless failing over of storage access to a mirror copy hosted in a remote data center. This type of failover is also known as zero RTO, near zero RTO, or automatic failover. A cross-site high availability storage when deployed with host clustering enables workloads to be in both data centers.

Given that more workloads are moving to a cloud environment and many customers deploy hybrid cloud, applications will also demand these same features in the cloud including cross-site high availability, planned failover, planned migration, etc.

As such, embodiments described herein seek to improve the technological processes of multi-site distributed data storage systems. Various embodiments of the present technology provide for a wide range of technical effects, advantages, and/or improvements to multi-site distributed storage systems and components. The present storage solution provides optimization techniques to improve application I/O resumption time and faster resynchronization during recovery of disaster site, upon failure of secondary site, or a network partition between primary and secondary storage sites for a symmetric distributed storage system in accordance with an embodiment of the present disclosure. An order of operations of a computer-implemented method reduces application I/O resumption time due to a disaster event temporarily causing loss of a primary storage site for a symmetric distributed storage system in accordance with an embodiment of the present disclosure. For this method, the primary storage site swiftly recognizes that the secondary storage site has assumed a primary role for serving I/O operations after the disaster event. The primary storage site sends a cross-cluster call to the secondary storage site to ensure that the primary storage site does not independently transition to a secondary role and only proceeds with a role flip if the secondary storage site has transitioned to the primary role.

In another example, an order of operations of a computer-implemented method reduces application I/O resumption time due to a disaster event temporarily causing loss of a secondary storage site or a network partition for a symmetric distributed storage system in accordance with an embodiment of the present disclosure. For a temporary loss of connectivity to the secondary storage site, this method sends communications to the secondary site via both the inter-cluster (IC) channel or links and using a connection between an external mediator and the secondary storage site. In one example, after conclusively determining that there is no connectivity to all nodes on the secondary site via both the IC links and mediator connection, the primary storage site prematurely terminates a timer for a first predetermined time period to remain in the fenced state and acquires consensus from the mediator to resume I/O operations. The health check process sends multiple communications to account for transient unavailability or link failures.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

TERMINOLOGY

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135, 145, and optional cluster 155 or a managed service provider responsible for multiple distributed storage systems of the same or multiple customers may monitor various operations and network conditions of the distributed storage system or multiple distributed storage systems via a browser-based interface presented on computer system 110. The distributed storage system 102 provides a fully symmetric storage solution that allows simultaneous read-write access to both the primary and secondary copies of the data.

In the context of the present example, the multi-site distributed storage system 102 includes a data center 130, a data center 140, an optional data center 150, and optionally a mediator 120. The data centers 130, 140, 150, the mediator 120, and the computer system 110 are coupled in communication via a network 105, which, depending upon the particular implementation, may be a Local Area Network (LAN), a Wide Area Network (WAN), or the Internet.

The data centers 130, 140, and 150 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130, 140, and 150 may represent a colocation data center in which a company rents space of a facility owned by others and located off the company premises. The data centers are shown with a cluster (e.g., cluster 135, cluster 145, cluster 155). Those of ordinary skill in the art will appreciate additional IT infrastructure may be included within the data centers 130, 140, and 150. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center. The cluster 155 of optional data center 150 can have an asynchronous relationship, synchronous relationship, or be a vault retention of the cluster 135 of the data center 130.

Turning now to the cluster 135, it includes a configuration database 138, multiple storage nodes 136*a-n* each having a respective mediator agent 139*a-n*, and an Application Programming Interface (API) 137. In the context of the present example, the multiple storage nodes 136*a-n* are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136*a-n* may be distributed across multiple storage units embodied as persistent storage devices, including but not limited to HDDs, SSDs, flash memory systems, or other storage devices. In a similar manner, cluster 145 includes a configuration database 148, multiple storage nodes 146*a-n* each having a respective mediator agent 149*a-n*, and an Application Programming Interface (API) 147. In the context of the present example, the multiple storage nodes 146*a-n* are organized as a cluster and provide a distributed storage architecture to service storage requests issued by one or more clients of the cluster. Turning now to the optional cluster 155, it includes a configuration database 158, multiple storage nodes 156*a-b* each having a respective mediator agent 159*a-b*, and an Application Programming Interface (API) 157.

The API 137 may provide an interface through which the cluster 135 is configured and/or queried by external actors (e.g., computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only three data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
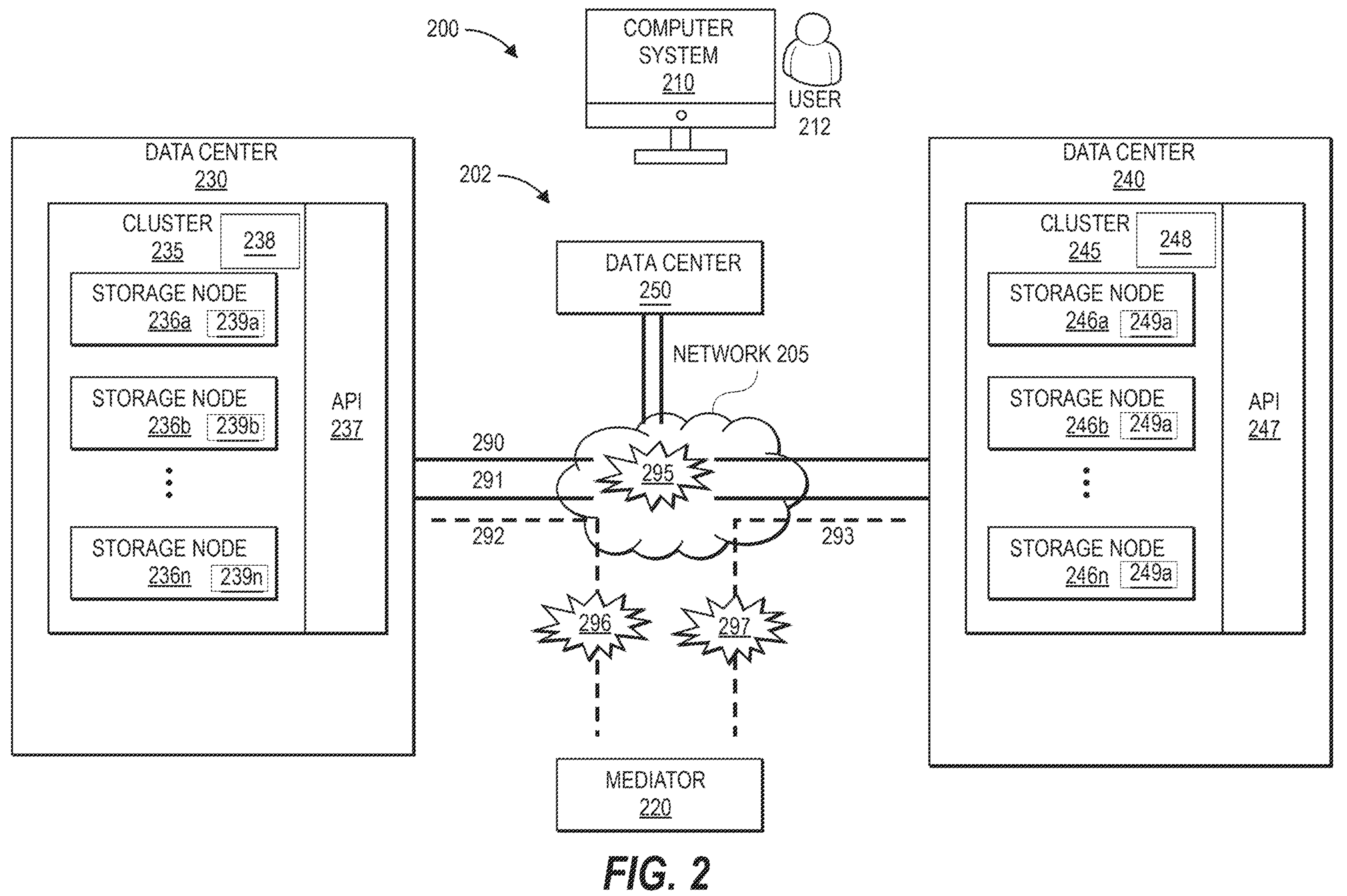
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, an optional data center 250, and optionally a mediator 220. The data centers 230, 240, and 250, the mediator 220, and the computer system 210 are coupled in communication via a network 205, which, depending upon the particular implementation, may be a Local Area Network (LAN), a Wide Area Network (WAN), or the Internet.

The data centers 230, 240, and 250 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230, 240 and 250 may represent a colocation data center in which a company rents space of a facility owned by others and located off the company premises. The data centers 230 and 240 are shown with a cluster (e.g., cluster 235, cluster 245). The data center 250 includes similar components as data centers 230 and 240. Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236*a*-*b*, optionally includes additional storage nodes (e.g., 236*n*) and an Application Programming Interface (API) 237. The storage nodes 236*a*-*n* each include a respective mediator agent 239*a*-*n*. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246*a*-*b*, optionally includes additional storage nodes (e.g., 246*n*) and includes an Application Programming Interface (API) 247. The storage nodes 246*a*-*n* each include a respective mediator agent 249*a*-*n*. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

A synchronous replication from a primary copy of data at a primary storage site (e.g., cluster 235) to a secondary copy of data at a secondary storage site (e.g., cluster 245) can fail due to inter cluster or cluster to mediator connectivity issues (e.g., failures 295, 296, 297). These issues can occur if the secondary storage site can not differentiate between the primary storage site being non-operational (or isolation), or just a network partition. A trigger for the automated failover is generated from a data path and if the data path is lost, this can lead to disruption. A data replication relationship between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure can occur in a cluster hosting the secondary mirror copy of the data. The failover feature of the present design guarantees non-disruptive operations (e.g., operations of business enterprise applications, operations of software application) even in the presence of these multiple failures.

In one example, each cluster can have up to 5 consistency groups with each consistency group having up to 12 volumes. The system 202 provides an automatic unplanned failover feature at a consistency group granularity. The failover feature allows switching storage access from a primary copy of the data center 230 to a mirror copy of the data center 240 or vice versa.

Figure 3:
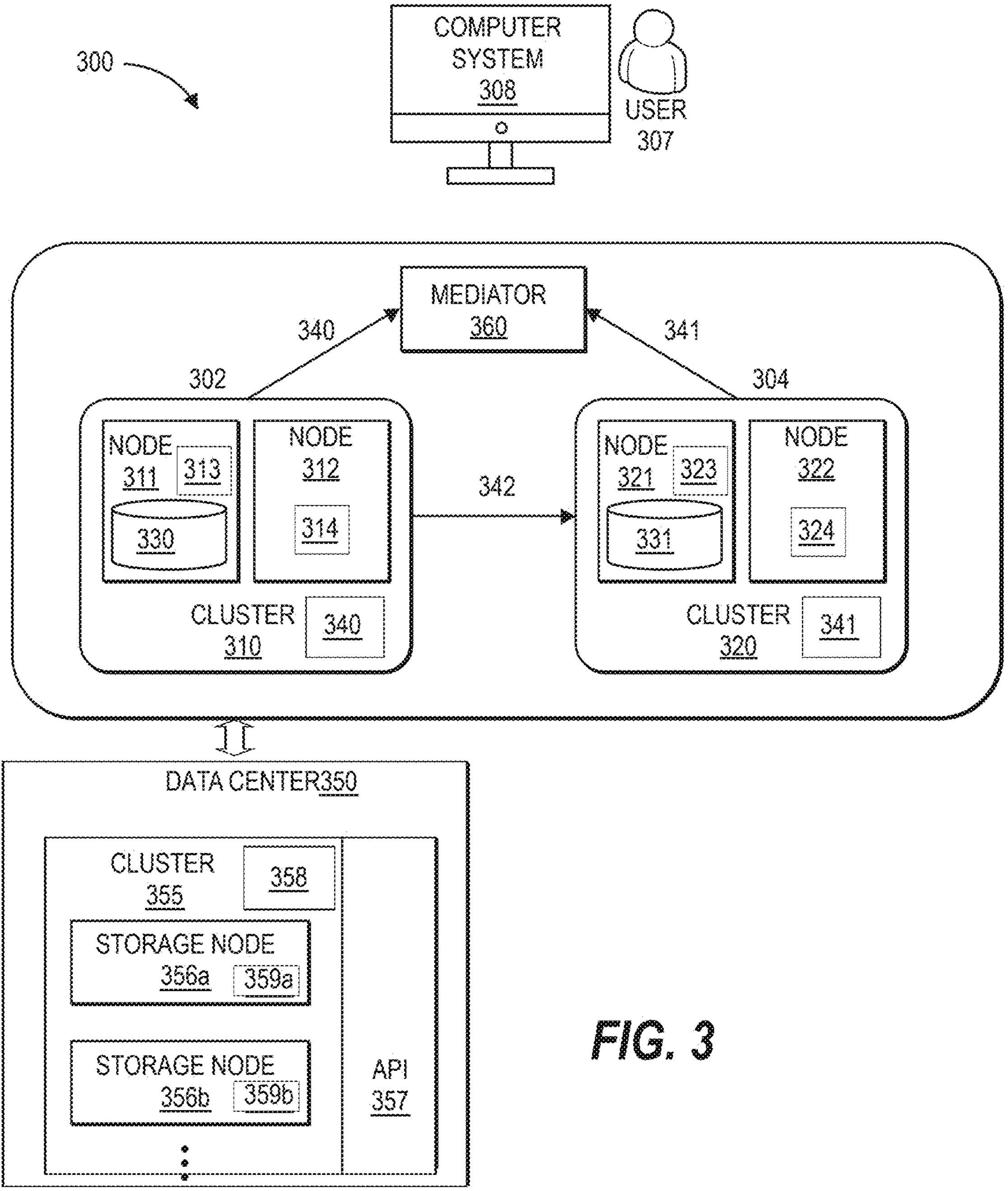
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 307) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, an optional data center 350 having a cluster 355, and a mediator 360. The clusters 310, 320, 355, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312, the cluster 320 includes nodes 321 and 322, and the optional cluster 355 includes nodes 356*a* and 356*b*. In one example, the cluster 320 has a data copy 331 that is a mirrored copy of the data copy 330 to provide non-disruptive operations at all times even in the presence of multiple failures including, but not limited to, network disconnection between the data centers 302 and 304 and the mediator 360. The cluster 355 may have an asynchronous replication relationship with cluster 310 or a mirror vault policy. The cluster 355 includes a configuration database 358, multiple storage nodes 356*a*-*b* each having a respective mediator agent 359*a*-*b*, and an Application Programming Interface (API) 357.

The multi-site distributed storage system 300 provides correctness of data, availability, and redundancy of data. In one example, the node 311 is designated as a leader and the node 321 is designated as a follower. The leader is given preference to serve I/O operations to requesting clients and this allows the leader to obtain a consensus in a case of a race between the clusters 310 and 320. The mediator 360 enables an automated unplanned failover (AUFO) in the event of a failure. The data copy 330 (leader), data copy 331 (follower), and the mediator 360 form a three way quorum. If two of the three entities reach an agreement for whether the leader or follower should serve I/O operations to requesting clients, then this forms a strong consensus.

The leader and follower roles for the clusters 310 and 320 help to avoid a split-brain situation with both of the clusters simultaneously attempting to serve I/O operations. For example, the leader may become unresponsive while a mediator detects this unresponsiveness to be a leader non-operational situation. The leader being non-operational can potentially cause a race between leader and follower copy both simultaneously attempting to obtain a consensus. However, only one of the leader and the follower should win the race and then be allowed to handle I/O operations. If this race is not prevented, it can result in the split-brain situation.

There are scenarios where both leader and follower copies can claim to be a leader copy. In one example, a follower cannot serve I/O until an AUFO happens. A leader doesn't serve I/O operations until the leader obtains a consensus.

The mediator agents (e.g., 313, 314, 323, 324, 359*a*, 359*b*) are configured on each node within a cluster. The system 300 can perform appropriate actions based on event processing of the mediator agents. The mediator agent(s) processes events that are generated at a lower level (e.g., volume level, node level) and generates an output for a consistency group level. In one example, the nodes 311, 312, 321, and 322 form a consistency group. The mediator agent provides services for various events (e.g., simultaneous events, conflicting events) generated in a business data replication relationship between each cluster.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (leader) while operations received by the node 321 (follower) are proxied to node 311.

Example Storage Node

Figure 4:
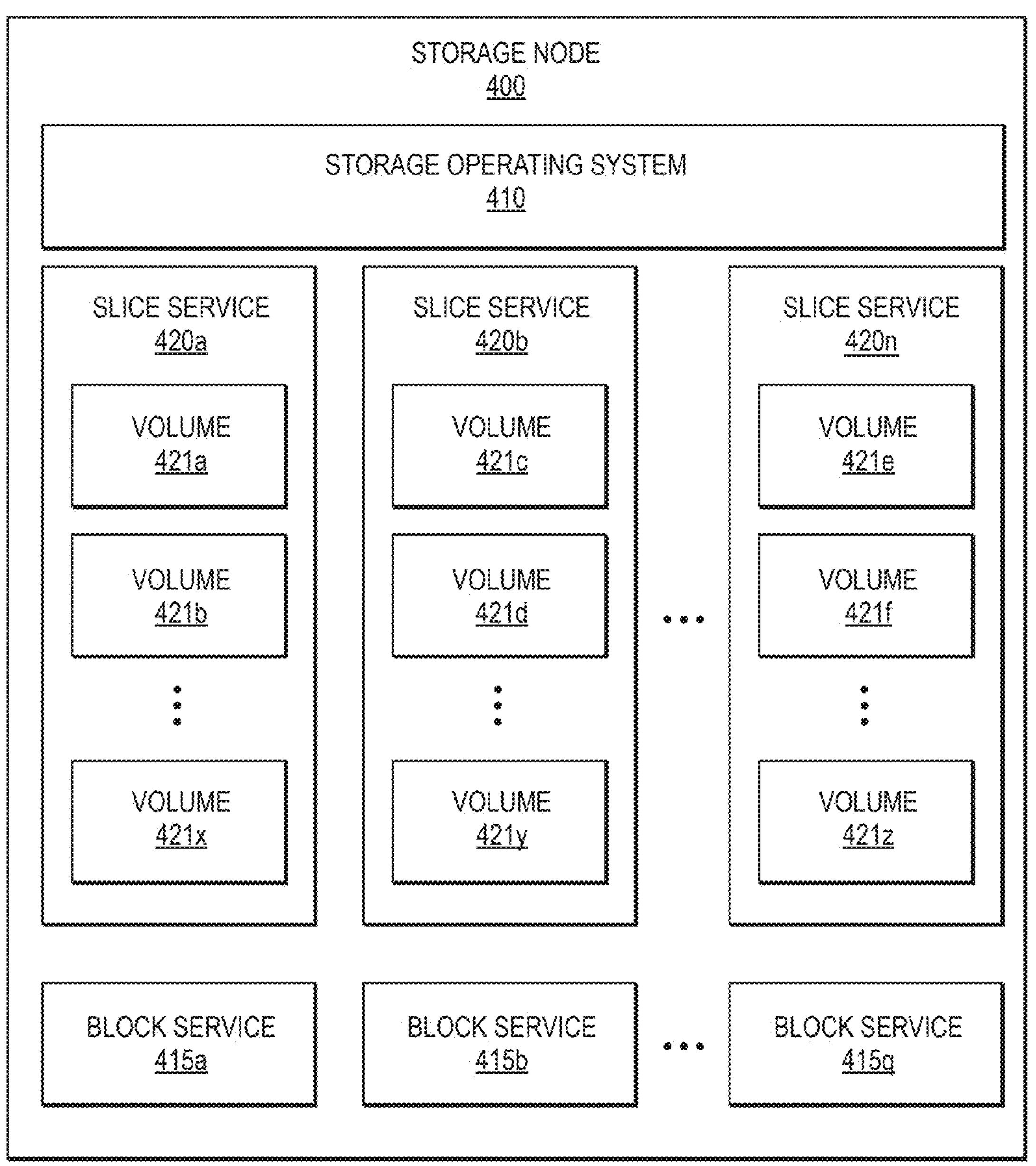
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136*a-n*, 146*a-n*, 236*a-n*, 246*a-n*, 311, 312, 331, 322, 712, 714, 752, 754) described herein. In the context of the present example, a storage node 400 may be a network storage controller or controller that provides access to data stored on one or more volumes. The storage node 400 includes a storage operating system 410, one or more slice services 420*a-n*, and one or more block services 415*a-q*. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a-x*, volumes 421*c-y*, and volumes 421*e-z*). Client systems (not shown) associated with an enterprise may store data to one or more volumes, retrieve data from one or more volumes, and/or modify data stored on one or more volumes.

The slice services 420*a-n* and/or the client system may break data into data blocks. Block services 415*a-q* and slice services 420*a-n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a-n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a-q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
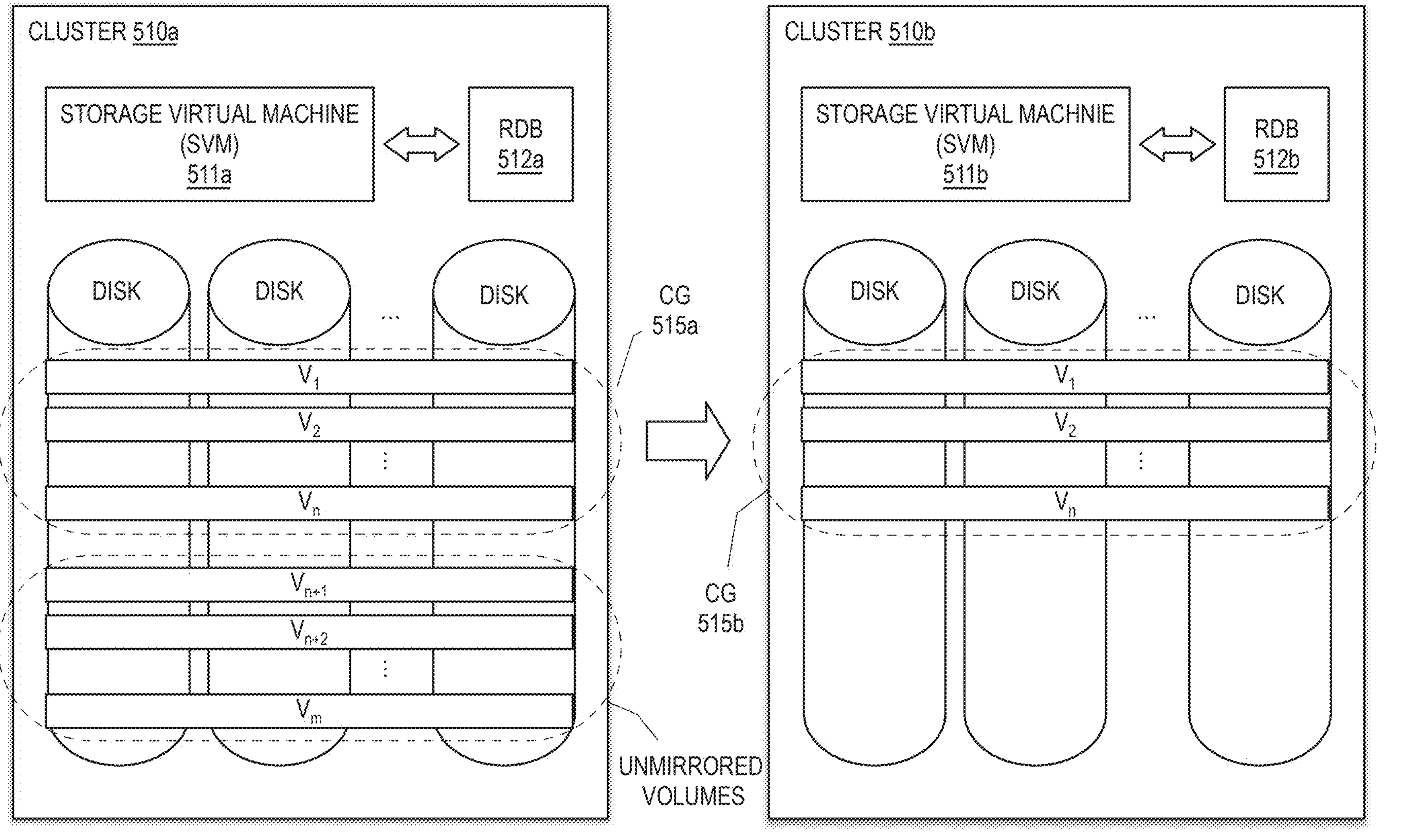
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 510*a* and 510*b*) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 510*a* may be operable within a first site (e.g., a local data center) and cluster 510*b* may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, storage expansion, container expansion, conversion process, and the like) may be performed at the level of granularity of a CG (e.g., CG 515*a* or CG 515*b*). A CG is a collection of storage objects or data containers (e.g., volumes) within a cluster that are managed by a Storage Virtual Machine (e.g., SVM 511*a* or SVM 511*b*) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time.

The volumes of a CG may span multiple disks (e.g., electromechanical disks and/or SSDs, redundant array of independent (RAID) disks) of one or more storage nodes of the cluster. RAID disks store the same data in different place on multiple hard disks or SSDs to protect data in case of a drive failure. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515*a* may be referred to as a local CG from the perspective of cluster 510*a* and as a remote CG from the perspective of cluster 510*b*. Similarly, CG 515*a* may be referred to as a remote CG from the perspective of cluster 510*b* and as a local CG from the perspective of cluster 510*b*. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512*a* and 512*b*), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 515*b*) to which data is configured to be synchronously replicated may be referred to as being in the role of a destination CG, whereas the CG (e.g., CG 515*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

The level of granularity of operations supported by a CG is useful for various types of applications. As a non-limiting example, consider an application, such as a database application, that makes use of multiple volumes, including maintaining logs on one volume and the database on another volume. In such a case, the application may be assigned to a local CG of a first cluster that maintains the primary dataset, including an appropriate number of member volumes to meet the needs of the application, and a remote CG, for maintaining a mirror copy of the primary dataset, may be established on a second cluster to protect the local CG.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of (or "peered") CGs associated with different clusters (e.g., from a primary cluster to a secondary cluster), data replication may also be performed asynchronously and/or within the same cluster. Similarly, a single remote CG may protect a single local CG and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary cluster is stored on more than one secondary cluster.

The various nodes (e.g., storage nodes) of the distributed storage systems described herein, and the processing described below with reference to the flow diagrams of FIGS. 7-12 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer systems described with reference to FIGS. 10-12 below.

Figure 6A:
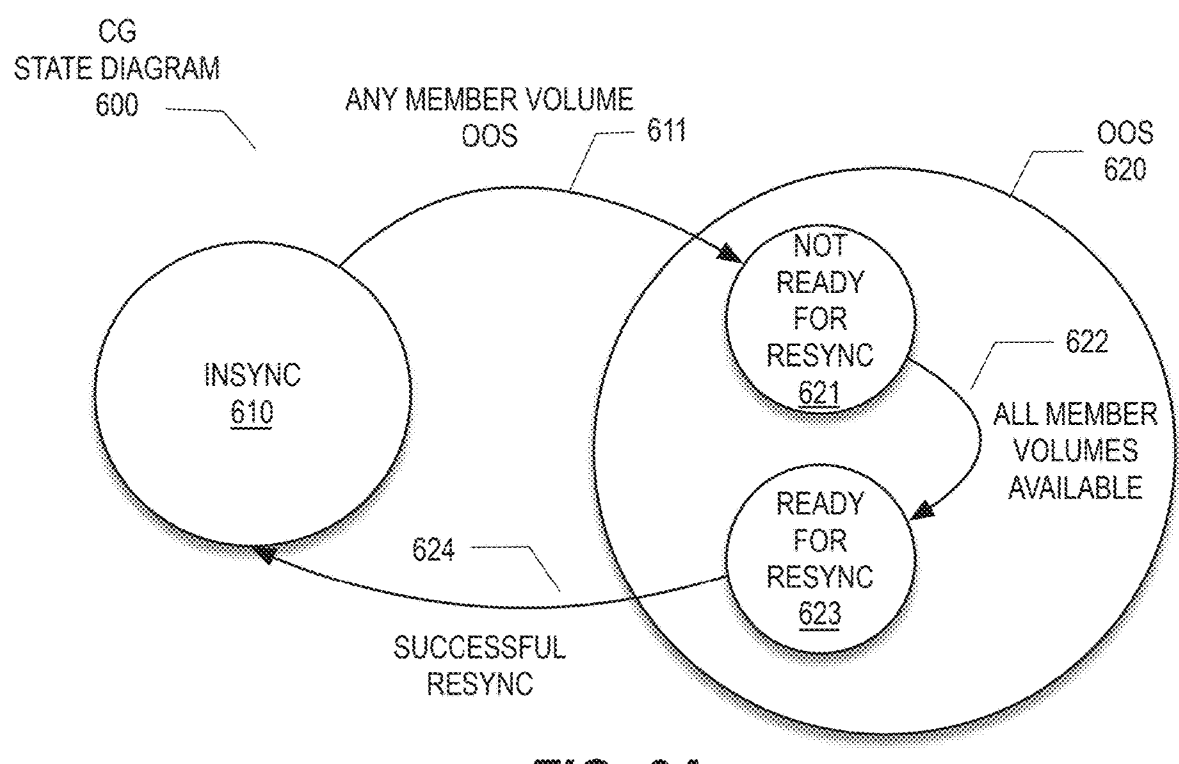
FIG. 6A is a CG state diagram in accordance with an embodiment of the present disclosure.

FIG. 6A is a CG state diagram 600 in accordance with an embodiment of the present disclosure. In the context of the present example, the data replication status of a CG can generally be in either of an InSync state (e.g., InSync 610)

or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512*a* or 512*b*).

As noted above, in various embodiments described herein, the members (e.g., volumes) of a CG may be managed as a single unit for various situations. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to bring the CG back into the InSync state from the OOS state. Responsive to a successful CG resync, a given CG may transition 624 from the ready for resync state 623 to the InSync state.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

Figure 6B:
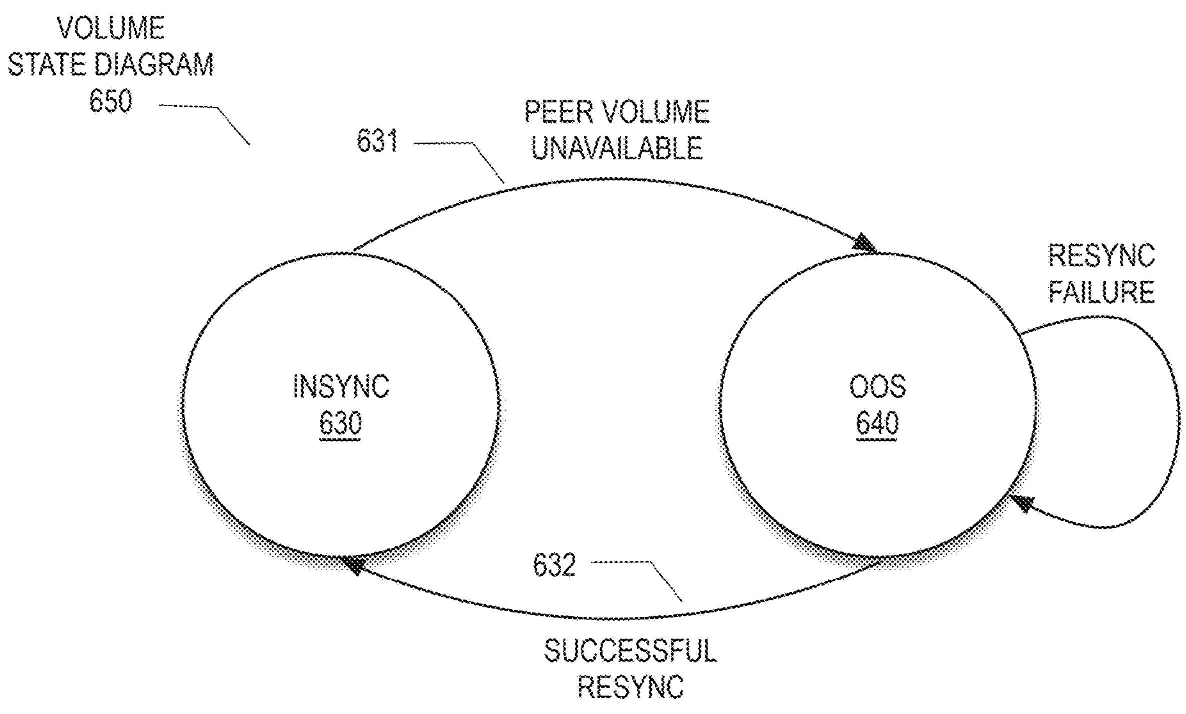
FIG. 6B is a volume state diagram in accordance with an embodiment of the present disclosure.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515*a*) is in the InSync state, the given volume may be said to be in-synchronization with a peer volume of a remote CG (e.g., CG 515*b*) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512*a* or 512*b*).

A given volume may transition 631 from the InSync state to the OOS state responsive to a peer volume being unavailable. A given volume may transition 632 from the OOS state to the InSync state responsive to a successful resynchronization with the peer volume. As described below in further detail, in one embodiment, two different types of resynchronization approaches may be implemented, including a Fast Resync process and a CG-level resync process, and selected for use individually or in sequence as appropriate for the circumstances.

Recovery of Primary Storage Site Due to a Disaster Event

The present design reduces I/O delay due to a disaster event causing temporary loss of primary storage site, failure of a secondary site, or a network partition between the primary storage site and the secondary storage site of a distributed storage system. Upon a disaster event on the primary storage site, an unplanned failover is triggered to activate the surviving secondary storage site which takes over the role of primary. Eventually when the disaster-stricken site is recovered, it boots up with the last known role as primary and there is a process of contention to resolve the "split brain" scenario where both sites contend to be the primary. Until this contention is resolved, the I/O Ops for client devices will face a transition error causing I/O latency.

Figure 7:
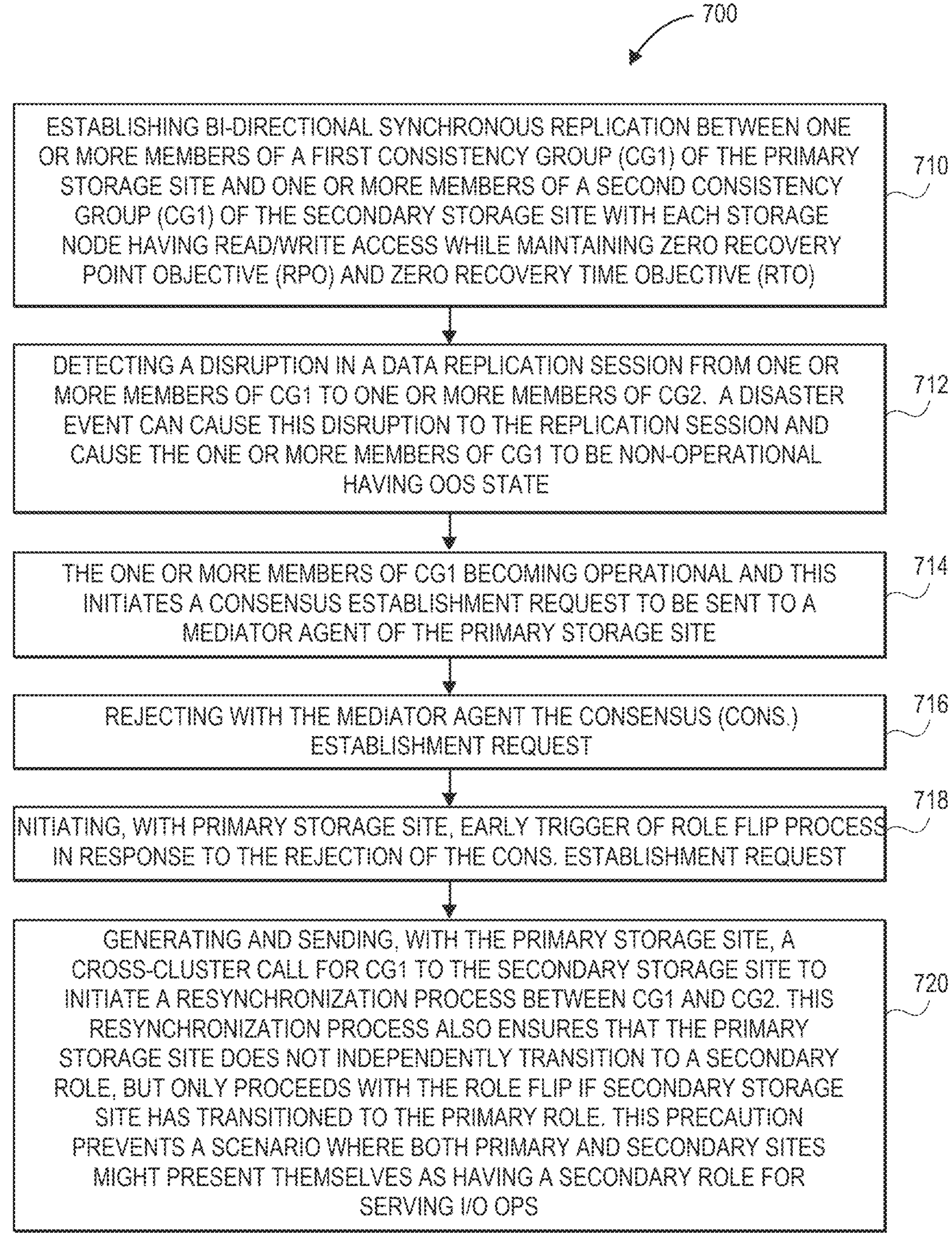
FIG. 7 is a flow diagram illustrating a computer-implemented method for reducing application I/O resumption time due to a disaster event temporarily causing loss of a primary storage site for a symmetric distributed storage system in accordance with an embodiment of the present disclosure.

FIG. 7 is a flow diagram illustrating a computer-implemented method for reducing application I/O resumption time due to a disaster event temporarily causing loss of a primary storage site for a symmetric distributed storage system in accordance with an embodiment of the present disclosure. State information regarding members (e.g., storage volumes) of a local CG can be maintained. The state information may include a data replication status of a mirror copy of a dataset associated with a local CG (e.g., CG 515*a*) may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

Although the operations in the computer-implemented method 700 are shown in a particular order, the order of the actions can be modified. Thus, the illustrated embodiments can be performed in a different order, and some operations may be performed in parallel. Some of the operations listed in FIG. 7 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 700 may be executed by a storage controller, a storage virtual machine (e.g., SVM 511*a*, SVM 511*b*), a mediator (e.g., mediator 120, mediator 220, mediator 360), a mediator agent (e.g., mediator agent 139*a*-139*n*, mediator agent 149*a*-149*n*, mediator agent 239*a*-239*n*, mediator agent 249*a*-249*n*, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

At operation 710, the computer-implemented method includes establishing bi-directional synchronous replication between one or more members of a first consistency group (CG1) of the primary storage site and one or more members of a second consistency group (CG1) of the secondary storage site with each storage node having read/write access while maintaining zero recovery point objective (RPO) and Zero recovery time objective (RTO).

In one embodiment, a multi-site distributed storage system includes a primary storage site having a first cluster with a primary copy of data in a consistency group (CG1). The consistency group of the first cluster is initially assigned a primary role. A second cluster of the secondary storage site has a secondary mirror copy of the data in a consistency group. The consistency group of the second cluster (CG2) is initially assigned a secondary role. The storage system handles input/output (I/O) requests from the client device having an application. The primary storage site and secondary storage site communicate via a network.

At operation 712, the computer-implemented method includes detecting a disruption in a data replication session from one or more members of CG1 to one or more members of CG2. A disaster event can cause this disruption to the replication session and cause the one or more members of CG1 to be non-operational having OOS state and initiate an unplanned failover causing CG2 to transition from a secondary role to a primary role for serving I/O operations. At operation 714, the method includes the one or more members of CG1 becoming operational and this initiates a consensus establishment request to be sent to a mediator agent of the primary storage site.

At operation 716, the computer-implemented method includes rejecting with the mediator agent the consensus establishment request. At operation 718, the computer-implemented method includes initiating, with the primary storage site, an early trigger of a role flip process in response to the rejection of the consensus establishment request. Then, at operation 720, the primary storage site generates and sends a cross-cluster call for CG1 to the secondary storage site to initiate a resynchronization process between CG1 and CG2. This resynchronization process also ensures that the primary storage site does not independently transition to a secondary role, but only proceeds with the role flip if secondary storage site has transitioned to the primary role. This precaution prevents a scenario where both primary and secondary sites might present themselves as having a secondary role for serving I/O Ops. In a conventional approach, a role flip process is initiated from a newly converted secondary storage site based on a scheduled polling job. However, in this optimized method 700 the flip process is preempted by having the primary storage site send the cross-cluster call to the secondary storage site to quickly initiate the resynchronization process between CG1 and CG2 to return CG1 and CG2 back to in sync state sooner, and reduce resumption time of the zero RPO status.

Figure 8:
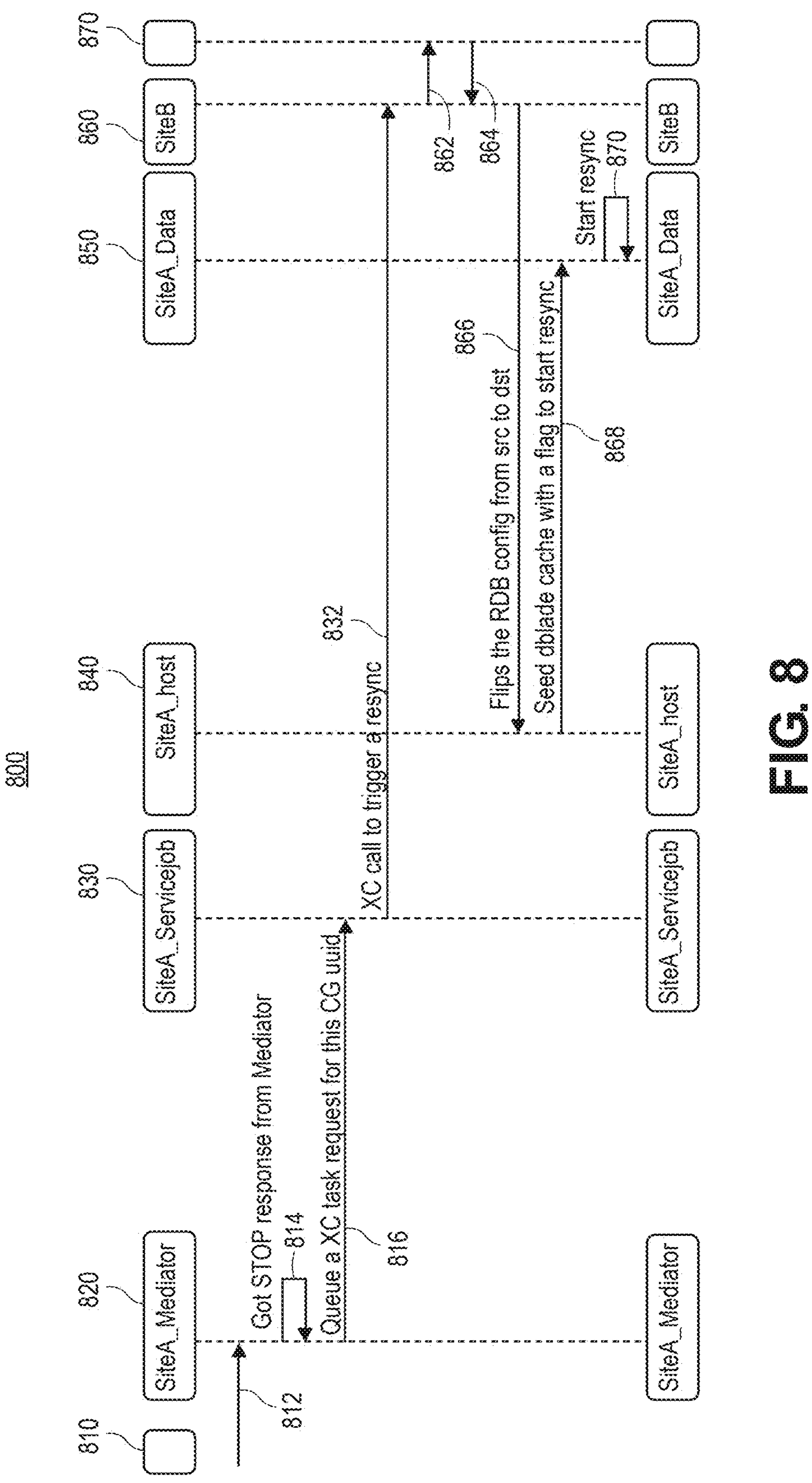
FIG. 8 is a flow diagram illustrating an order of operations of a computer-implemented method for improving application I/O resumption time due to a disaster event temporarily causing loss of a primary storage site for a symmetric distributed storage system in accordance with an embodiment of the present disclosure.

FIG. 8 is a flow diagram illustrating an order of operations of a computer-implemented method for improving application I/O resumption time due to a disaster event temporarily causing loss of a primary storage site for a symmetric distributed storage system in accordance with an embodiment of the present disclosure. State information regarding members (e.g., storage volumes) of a local CG can be maintained. The state information may include a data replication status of a mirror copy of a dataset associated with a local CG (e.g., CG 515*a*) may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

Although the operations in the computer-implemented method 800 are shown in a particular order, the order of the actions can be modified. Thus, the illustrated embodiments can be performed in a different order, and some operations may be performed in parallel. Some of the operations listed in FIG. 8 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 800 may be executed by a storage controller, a storage virtual machine (e.g., SVM 511*a*, SVM 511*b*), a mediator (e.g., mediator 120, mediator 220, mediator 360), a mediator agent (e.g., mediator agent 139*a*-139*n*, mediator agent 149*a*-149*n*, mediator agent 239*a*-239*n*, mediator agent 249*a*-249*n*, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

Initially, the computer-implemented method includes establishing bi-directional synchronous replication between one or more members of a first storage node of the primary storage site and one or more members of a second storage node of the secondary storage site with each storage node having read/write access while maintaining zero recovery point objective (RPO) and Zero recovery time objective (RTO).

In one embodiment, a multi-site distributed storage system includes a primary storage site (e.g., site A) having a first cluster with a primary copy of data in a consistency group (CG1). The consistency group of the first cluster is initially assigned a primary role. A second cluster of the secondary storage site (e.g., site B) has a secondary mirror copy of the data in a consistency group. The consistency group of the second cluster (CG2) is initially assigned a secondary role. The storage system handles input/output (I/O) requests from the client device having an application. The primary storage site and secondary storage site communicate via a network. The primary storage site includes an admin component 810, a mediator agent 820, a service job 830, a host 840, and a data plane 850. The secondary storage site includes a host 860 and a data plane 870.

The storage system detects a disruption in a replication session from one or more members of CG1 to one or more members of CG2. A disaster event can cause this disruption to the replication session and cause the one or more members of CG1 to be non-operational having OOS state. At operation 812, the method includes the one or more members of CG1 becoming operational and being processed with a previous state of primary role. This initiates a consensus establishment request to be sent to a mediator agent of the primary storage site.

At operation 814, the computer-implemented method includes rejecting with the mediator agent the consensus establishment request. At operation 816, the computer-implemented method includes initiating a role flip process in response to the rejection of the consensus establishment request, and the method also queues a cross-cluster call to initiate a resynchronization process between one or more members of CG1 and one or more members of CG2. At operation 832, the service job 830 sends the cross-cluster call for CG1 to a host 870 of the secondary storage site to initiate the resynchronization process between CG1 and CG2. This resynchronization process also ensures that the primary storage site does not independently transition to a secondary role, but only proceeds with the role flip if secondary storage site has transitioned to the primary role. This precaution prevents a scenario where both primary and secondary sites might present themselves as having a secondary role for serving I/O Ops.

At operation 862, the host 860 sends a start resync call to the data plane 870 of the secondary storage site. At operation 864, the data plane 870 sends an upcall to the host 860 to start the role flip resynchronization process. At operation 866, the host 860 sends a communication to the host 840 to flip replicated database (RDB) configuration information from source to destination for the primary storage site. At operation 868, the host 840 sends a communication to the data plane 850 to seed data plane cache with a flag to start resynch between CG1 and CG2. At operation 870, the data plane 850 starts the resynchronization process.

Recovery of Secondary Storage Site Due to a Failure

When the secondary storage site encounters a failure, the disruption on a replication state forces the primary storage site to reestablish consensus. However, in order to cover for temporary faults like non-disruptive operations, a previous approach allows up to a predetermined time period for the secondary storage site to re-establish the sync replication via a fast resync process. In case of a longer failure duration like a power outage on a secondary storage cluster, the primary storage site will remain in a fenced state for the predetermined time period causing I/O latency spike in this period.

Network Partition:

When the inter-cluster replication link encounters a failure, the disruption on the replication state forces the primary site to reestablish consensus. But in order to cover for temporary faults like non-disruptive operations, a previous approach allows up to a predetermined time period for the secondary storage site to reestablish the sync replication via a fast resync process. In case of a longer interconnect (IC) link outage between the primary and secondary storage sites, the primary site will remain in a fenced state for the time period causing I/O latency spike in this period.

Figure 9A:
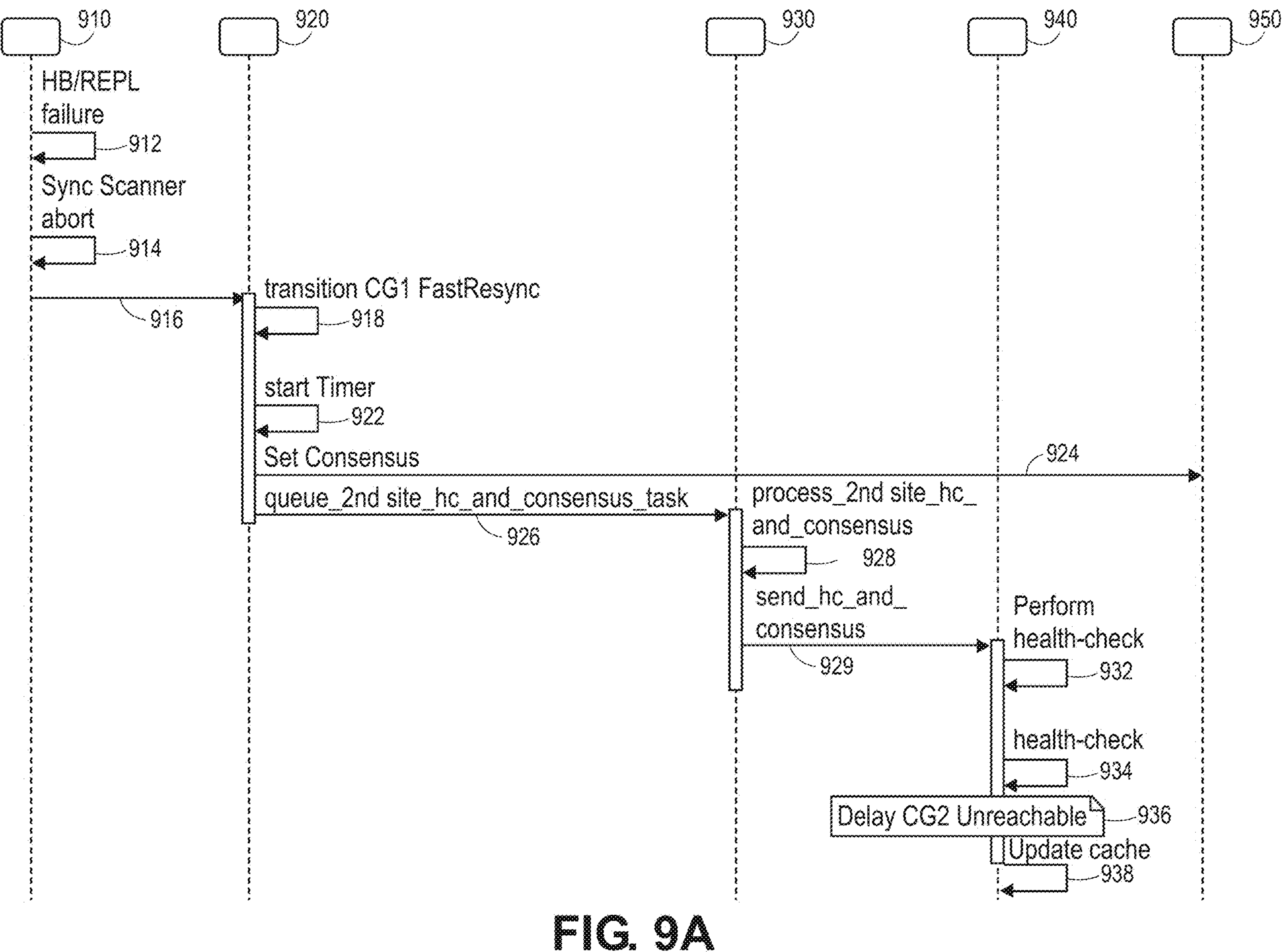
FIGS. 9A, 9B, and 9C illustrate a flow diagram for an order of operations of a computer-implemented method for reducing application I/O resumption time due to a disaster event temporarily causing loss of a secondary storage site or a network partition for a symmetric distributed storage system in accordance with an embodiment of the present disclosure.
Figure 9B:
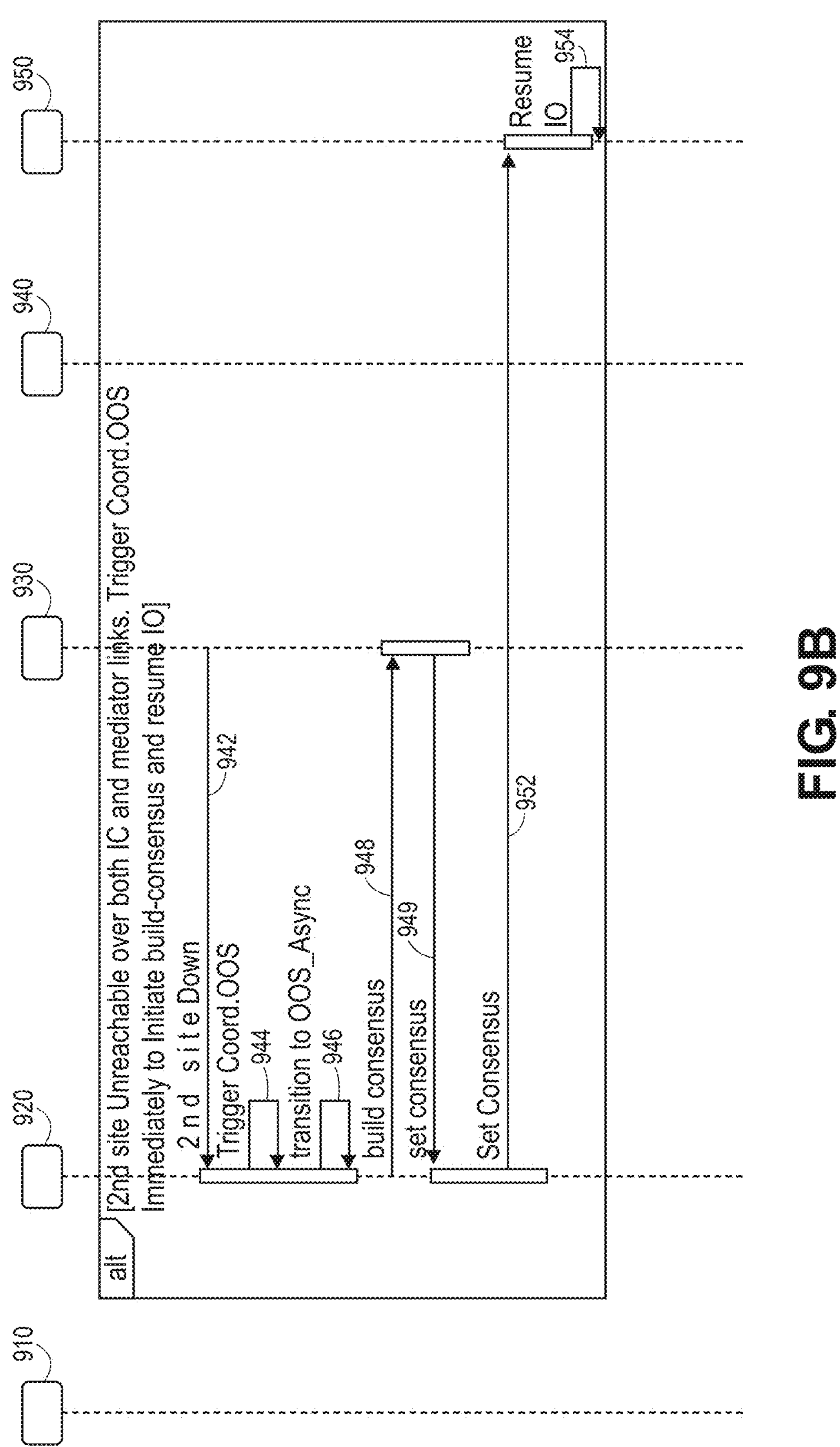
Figure 9C:
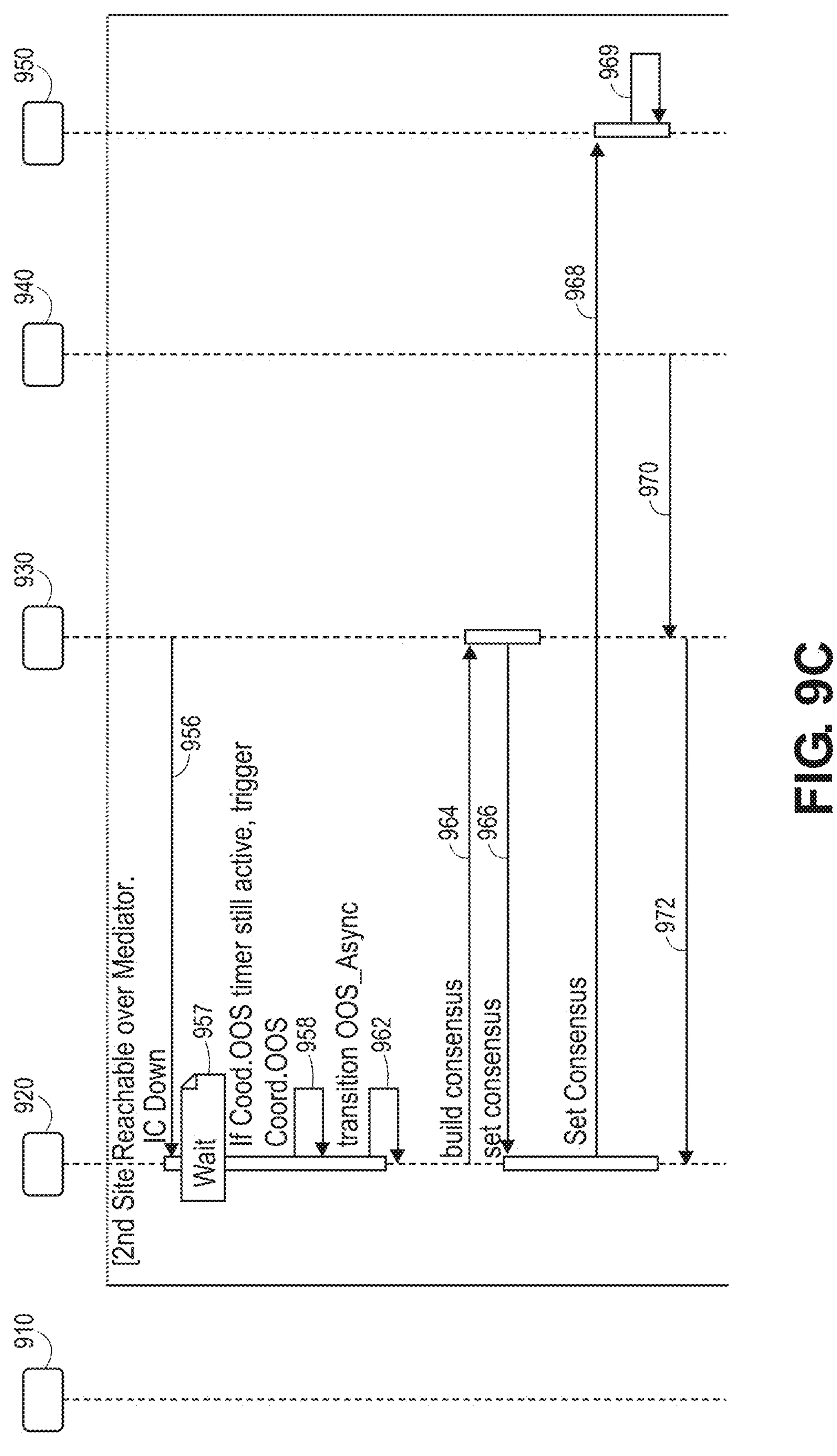

When the primary storage site detects a disruption in the replication session based on a failure on the secondary storage site or a network partition between the primary and secondary storage sites, the primary storage site transitions into a fenced state and initiates a peer health check process as illustrated in FIGS. 9A, 9B, and 9C. FIGS. 9A, 9B, and 9C are a flow diagram illustrating an order of operations of a computer-implemented method for reducing application I/O resumption time due to a disaster event temporarily causing loss of a secondary storage site or a network partition for a symmetric distributed storage system in accordance with an embodiment of the present disclosure.

State information regarding members (e.g., storage volumes) of a local CG can be maintained. The state information may include a data replication status of a mirror copy of a dataset associated with a local CG (e.g., CG 515*a*) may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

Although the operations in the computer-implemented method 800 are shown in a particular order, the order of the actions can be modified. Thus, the illustrated embodiments can be performed in a different order, and some operations may be performed in parallel. Some of the operations listed in FIGS. 9A, 9B, and 9C are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 900 may be executed by a storage controller, a storage virtual machine (e.g., SVM 511*a*, SVM 511*b*), a mediator (e.g., mediator 120, mediator 220, mediator 360), a mediator agent (e.g., mediator agent 139*a*-139*n*, mediator agent 149*a*-149*n*, mediator agent 239*a*-239*n*, mediator agent 249*a*-249*n*, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

Initially, the computer-implemented method includes establishing bi-directional synchronous replication between one or more members of a first storage node of the primary storage site and one or more members of a second storage node of the secondary storage site with each storage node having read/write access while maintaining zero recovery point objective (RPO) and Zero recovery time objective (RTO).

In one embodiment, a multi-site distributed storage system includes a primary storage site (e.g., site A) having a first cluster with a primary copy of data in a consistency group (CG1). The consistency group of the first cluster is initially assigned a primary role. A second cluster of the secondary storage site (e.g., site B) has a secondary mirror copy of the data in a consistency group. The consistency group of the second cluster (CG2) is initially assigned a secondary role. The storage system handles input/output (I/O) requests from the client device having an application. The primary storage site and secondary storage site communicate via a network. The primary storage site includes transmission engine 910, a synchronous cache 920, a mediator agent 930, a mediator interface 940 to interface with an external mediator that is external from components of the primary storage site, and a file system 950 of the primary storage site.

The transmission engine 910 at operation 912 detects a failure in a heartbeat session with no heartbeat messages being received from the secondary storage site during a predetermined time period or a failure in a replication session from one or more members of CG1 to one or more members of CG2. A disaster event can cause this disruption to the heartbeat session or the replication session and cause the one or more members of CG2 to be non-operational having OOS state. Serving of I/O Ops is temporarily delayed with the primary and secondary storage sites being in a fenced state. At operation 914, the method includes a granular synchronous scanner abort to abort scanning for messages from CG2. At operation 916, the method includes sending a message from transmission engine 910 to sync cache 920 to abort sending messages to CG2.

At operation 918, the method includes transitioning CG1 to a fast resynchronization with CG2 and start a fence state to prevent input/output (I/O) operations on the one or more members of CG1 of the primary storage site. At operation 922, the method includes starting a fast resynchronization timer (e.g., a fast resynch timer for a 1st predetermined time period (e.g., 40-60 seconds), a coordinated out of sync timer for a 2nd predetermined time period (e.g., 5-20 seconds)). At operation 924, the method includes sending a message from the sync cache 920 to a file system 950 to set a consensus for a primary role in serving I/O Ops with a unique identifier (e.g., consensus state fast resync). At operation 926, the method includes queueing a health check task for the secondary storage site and a consensus task with the mediator agent 930. At operation 928, the method includes processing, with the mediator agent 930, the health check task for the secondary storage site and the consensus task. At operation 929, the method includes sending, with the mediator agent 930, the health check task for the secondary storage site and the consensus task to the mediator interface 940. At operation 932, the method includes performing, with the mediator interface 940, the health check task for the secondary storage site and at operation 934 the health check task is starting with the mediator agent and an external mediator via sending health check communications via interconnect links and via a connection between the external mediator and the secondary storage site.

At operation 936, a short time delay is implemented to wait for a response from the secondary storage site. A cache is updated based on the response or lack of response from the secondary storage site at operation 938.

If CG2 of the secondary storage site is unreachable (non-responsive) via both the IC links and mediator to CG2 links, then the method includes determining that CG2 of the secondary storage site is down (non-operational), sending this determination to sync cache 920, and prematurely terminating the fast resync timer to temporarily remain in the fenced state at operation 942 as illustrated in FIG. 9B. At operation 944, the method includes initiating a coordinating OOS with the sync cache 920 in response to the secondary storage site being unreachable. At operation 946, the method includes transitioning to an OOS asynchronous state. At operation 948, the method includes sending a build consensus task to the mediator agent 930. At operation 949, the method includes sending a set consensus to the sync cache 920 based on voting of an external mediator via the mediator agent 930 and voting of the primary storage site. In this example, the external mediator and the primary storage site both vote to set consensus to the primary storage site to have a primary role for serving I/O Ops. At operation 952, the method includes sending a message from the sync cache 920 to the file system 950 to set a consensus to the primary storage site for a primary role in serving I/O Ops with a unique identifier (e.g., consensus state). At operation 954, the method includes resuming I/O Ops on the file system of the primary storage site.

As discussed above, this method 900 sends pings to the secondary storage site via both the inter-cluster links and via the external mediator. If the health checks reveal reachability over the mediator channel and non-reachability over the IC channel, this indicates a network partition between the primary and secondary storage sites as illustrated in FIG. 9C.

In this case, the mediator agent determines that the IC links are down and sends a message to the sync cache 920 at operation 956. At operation 957, the primary storage site waits for a predetermined time period (e.g., 10-15 seconds) to allow for a potential IC network recovery. A coordinated OOS timer is started for this purpose. If the IC link recovers during the predetermined time period, then the secondary storage site will initiate a fast-resync workflow which will eventually reach the secondary storage site and deactivate the coordinated OOS timer. Otherwise, at the end of the predetermined time period, the primary storage site will trigger coordinate OOS at operation 958 and transition to OOS state asynchronous at operation 962, thereby terminating a fast-resync timer.

The method will then acquire consensus from the mediator to resume I/O Ops. At operation 964, the method includes sending a build consensus task to the mediator agent 930. At operation 966, the method includes sending a set consensus to the sync cache 920 based on voting of an external mediator via the mediator agent 930 and voting of the primary storage site. In this example, the external mediator and the primary storage site both vote to set consensus to the primary storage site to have a primary role for serving I/O Ops. At operation 968, the method includes sending a message from the sync cache 920 to the file system 950 to set a consensus to the primary storage site for a primary role in serving I/O Ops with a unique identifier (e.g., consensus state). At operation 969, the method includes resuming I/O Ops on the file system of the primary storage site.

As a result of the method 900, the I/O temporary pause due to a failure on the secondary storage site or a network partition is reduced by 60-70% compared to a previous approach in this scenario.

In another example, if the secondary storage site and IC links are both operational, then at operation 970 the mediator interface 940 sends a message to the mediator agent 930 indicating that the secondary storage site and IC links are both operational. At operation 972, the method includes resetting the coordinated OOS timer due to this message and based on the fast resync being triggered from the secondary storage site.

The symmetric distributed storage system is then able to allow simultaneous read-write access to both the primary and secondary copies of the data. The storage system provides application-granular zero recovery point objective (ZRPO) data protection that prevents any data loss and zero recovery time objective (ZRTO) transparent failover that provides instant recovery in the event of various faults.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 10:
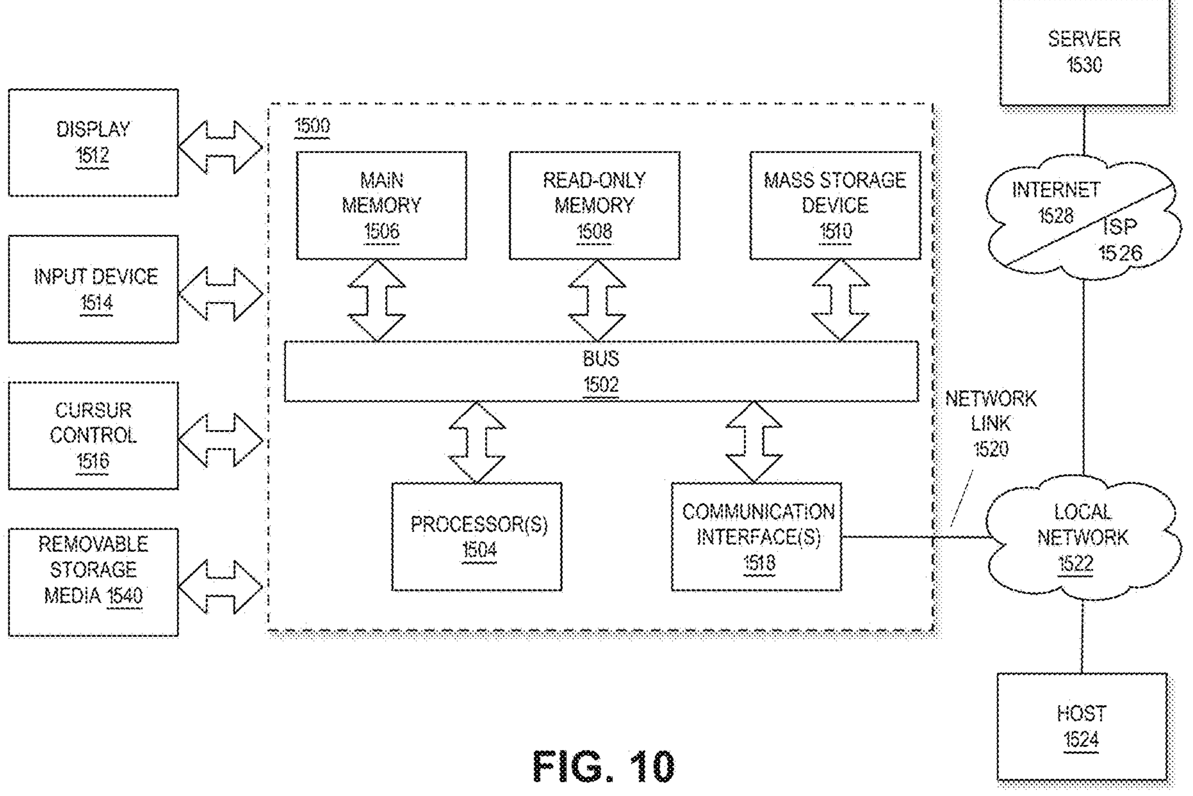
FIG. 10 illustrates an example computer system in which or with which embodiments of the present disclosure may be utilized.

FIG. 10 is a block diagram that illustrates a computer system 1500 in which or with which an embodiment of the present disclosure may be implemented. Computer system 1500 may be representative of all or a portion of the computing resources associated with a storage node (e.g., storage node 136*a-n*, storage node 146*a-n*, storage node 156*a-b*, storage node 236*a-n*, storage node 246*a-n*, nodes 311-312, nodes 321-322, nodes 356*a*-356*b*, storage node 400), a mediator (e.g., mediator 120, mediator 220, mediator 360), or an administrative workstation (e.g., computer system 110, computer system 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., processing logic, hardware processor(s) 1504) coupled with bus 1502 for processing information. Hardware processor 504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, a non-transitory computer-readable storage medium, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

Figure 11:
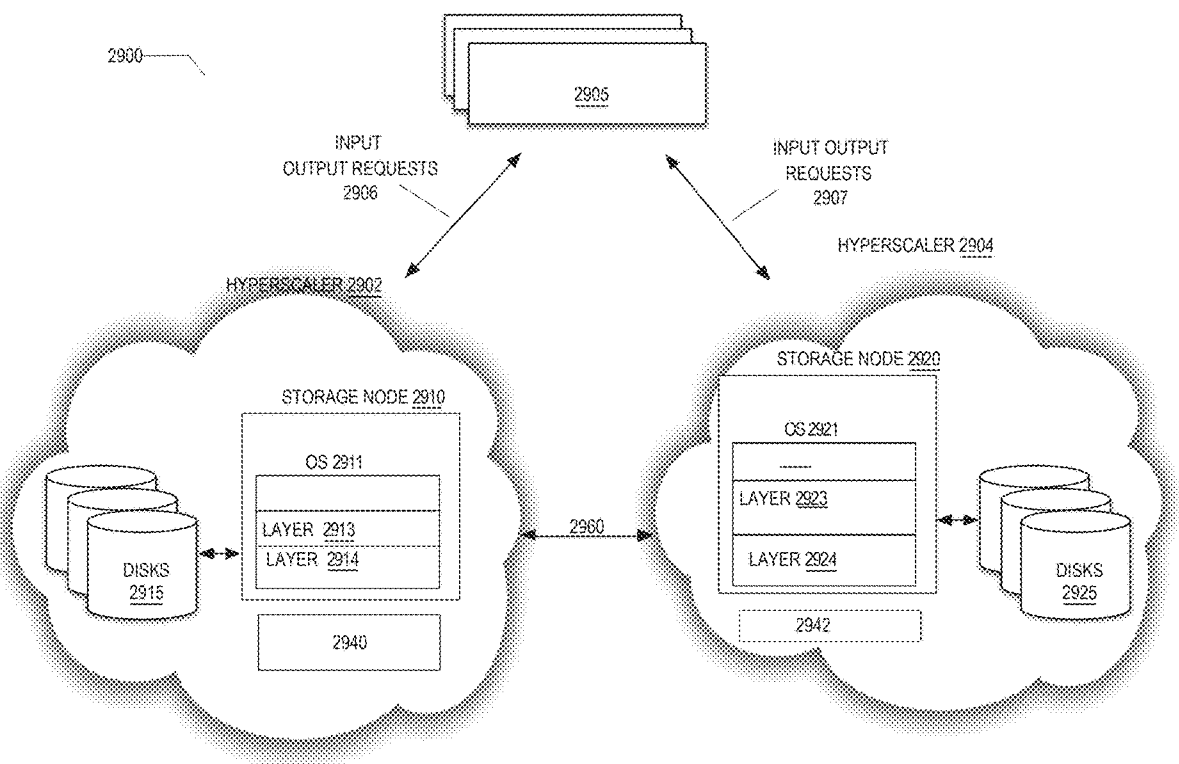
FIG. 11 is a block diagram illustrating a cloud environment in which various embodiments may be implemented (e.g., virtual storage nodes of a primary storage site, a secondary storage site, and a tertiary storage site).

FIG. 11 is a block diagram illustrating a cloud environment in which various embodiments may be implemented (e.g., virtual storage nodes of a primary storage site, a secondary storage site, and a tertiary storage site). In various examples described herein, a virtual storage system 2900 may be run (e.g., on a VM or as a containerized instance, as the case may be) within a public cloud provider (e.g., hyperscaler 2902, 2904). In the context of the present example, the virtual storage system 2900 includes virtual storage nodes 2910 and 2920 and makes use of cloud disks (e.g., hyperscale disks 2915, 2925) provided by the hyperscaler.

The virtual storage system 2900 may present storage over a network to clients 2905 using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 2905 may request services of the virtual storage system 2900 by issuing Input/Output requests 2906, 2907 (e.g., file system protocol messages (in the form of packets) over the network). A representative client of clients 2905 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 2900 includes virtual storage nodes 2910 and 2920 with each virtual storage node being shown includes an operating system. The virtual storage node 2910 includes an operating system 2911 having layers 2913 and 2914 of a protocol stack for processing of object storage protocol operations or requests.

The virtual storage node 2920 includes an operating system 2921, layers 2923 and 2924 of a protocol stack for processing of object storage protocol operations or requests.

The storage nodes can include storage device drivers for transmission of messages and data via the one or more links 2960. The storage device drivers interact with the various types of hyperscale disks 2915, 2925 supported by the hyperscalers.

The data served by the virtual storage nodes may be distributed across multiple storage units embodied as persistent storage devices (e.g., non-volatile memory 2940, 2942), including but not limited to HDDs, SSDs, flash memory systems, or other storage devices (e.g., 2915, 2925).

Figure 12:
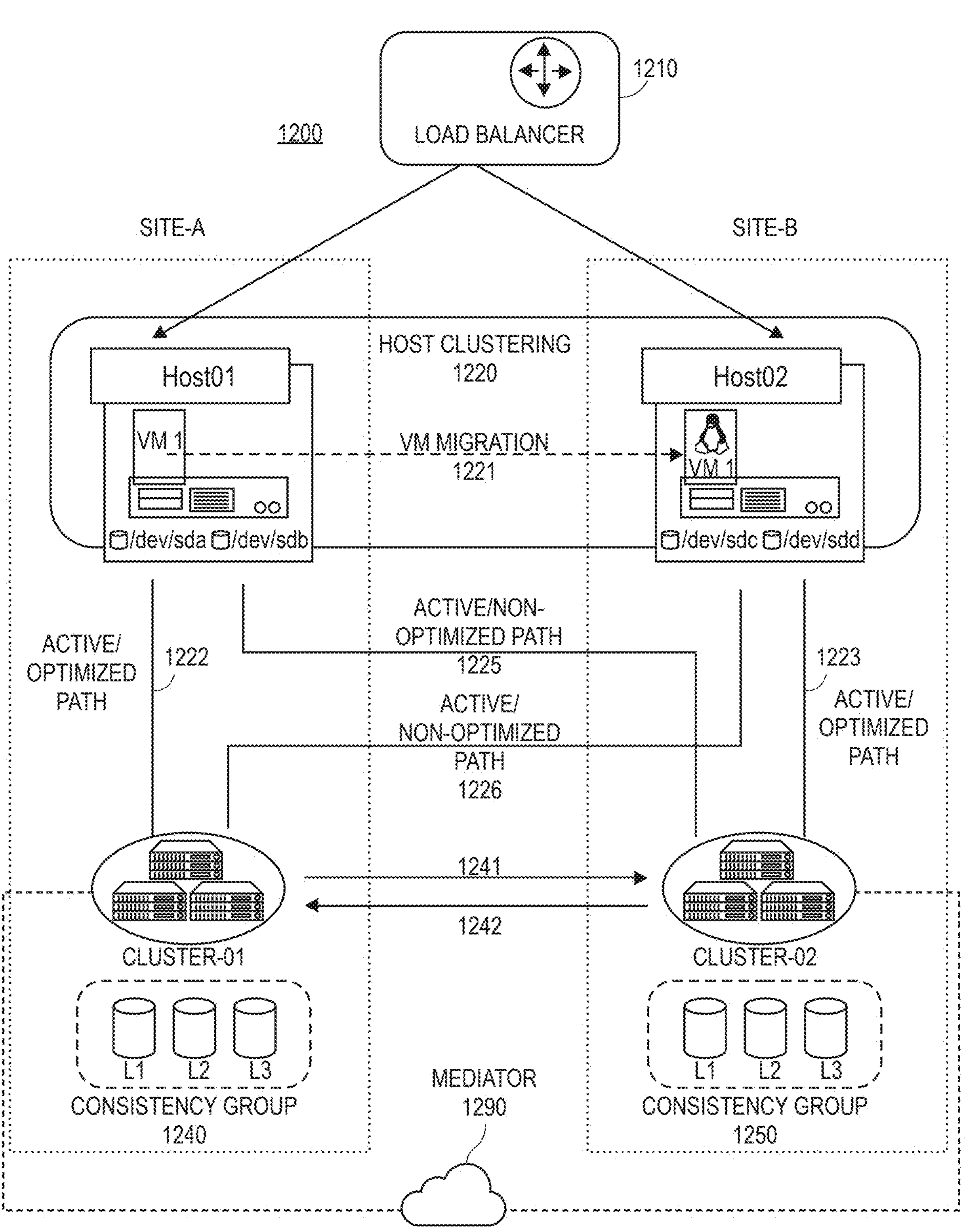
FIG. 12 is a block diagram illustrating a virtualized environment in which various embodiments may be implemented (e.g., virtual storage nodes of a primary storage site, a secondary storage site, and a tertiary storage site).

FIG. 12 is a block diagram illustrating a virtualized environment in which various embodiments may be implemented (e.g., virtual storage nodes of a primary storage site, a secondary storage site, etc.). In various examples described herein, a virtual storage system 1200 may be run (e.g., on a VM or as a containerized instance, as the case may be) within a public cloud provider. In the context of the present example, the virtual storage system 1200 includes a management server appliance 1210, a host clustering 1220 that includes host 01 and a host 02, and clusters 01 and 02. Cluster 01 includes a consistency group 1240 with L1, L2, and L3. Cluster 02 includes a consistency group 1250 with L1, L2, and L3.

To create a virtualized high availability host clustering 1220 across two sites A and B, hosts are used and managed by a server appliance 1210. The virtual machine (VM-1) can be migrated from host 01 to host 02. The server appliance 1210 is a centralized management system that enables administrators to effectively operate hosts in host clusters. The server appliance 1210 facilitates key functions such as VM provisioning, High Availability (HA), Distributed Resource Scheduler (DRS), Kubernetes Grid, and more. It is an important component in cloud environments.

The virtual storage system 1200 provides advanced business continuity if one or more failure domains suffer a total outage. The virtual storage system 1200 may present storage over a network to clients using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients may request services of the virtual storage system 1200 by issuing Input/Output requests (e.g., file system protocol messages (in the form of packets) over the network). A representative client may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the clusters 01 and 02 each include virtual storage nodes with each virtual storage node including an operating system. The storage nodes can include storage device drivers for transmission of messages and data via the one or more links 1241 and 1242.

The data served by the virtual storage nodes may be distributed across multiple storage units embodied as persistent storage devices (e.g., non-volatile memory), including but not limited to HDDs, SSDs, flash memory systems, or other storage devices.

The clusters 01 and 02 enable business services to continue operating even through a complete site failure, supporting applications to fail over transparently using a secondary copy. Neither manual intervention nor custom scripting are required to trigger a failover with active sync. The active sync supports a symmetric active capability, enabling read and write I/O operations from both copies of a protected LUN (e.g., L1, L2, L3) with bidirectional synchronous replication, enabling both LUN copies to serve I/O operations locally.

A data protection relationship to protect for business continuity is created between the source storage system (e.g., cluster 01) and destination storage system (e.g., cluster 02), by adding the application specific LUNs from different volumes within a storage virtual machine (SVM) to the consistency group. Under normal operations, the enterprise application writes to the primary consistency group (e.g., CG 1240), which synchronously replicates this I/O to the mirror consistency group (e.g., CG 1250). Even though two separate copies of the data exist in the data protection relationship, because active sync maintains the same LUN identity, the application host sees this as a shared virtual device with multiple paths (e.g., active/optimized paths 1222, 1223; active/non-optimized path 1225, 1226) while only one LUN copy is being written to at a time. Active Optimized paths are a path state in ALUA (Asymmetric Logical Unit Access) where the target storage system responds to I/O requests using the most efficient path. In this case, the active/optimized path 1222 is between host 01 and cluster 01 at site A while the active/optimized path 1223 is between host 02 and cluster 02 at site B. The active non-optimized paths 1225 and 1226 are between different sites. This results in higher performance and reduced latency.

When a failure renders the primary storage system offline, the operating system detects this failure and uses the Mediator 1290 for reconfirmation. If neither the operating system nor the Mediator 1290 are able to ping the primary site with cluster 01, the operating system performs the automatic failover operation. This process results in failing over only a specific application without the need for the manual intervention or scripting which was previously required for the purpose of failover.

The external Mediator 1290 is external from sites A and B and installed in a third failure domain, distinct from the two distinct failure domains of the clusters 01 and 02. The Mediator 1290 acts as a passive witness to active sync copies. In the event of a network partition or unavailability of one copy, active sync uses Mediator 1290 to determine which copy continues to serve I/O, while discontinuing I/O on the other copy. The Mediator 1290 plays a crucial role in active sync configurations as a passive quorum witness, ensuring quorum maintenance and facilitating data access during failures. It acts as a ping proxy for controllers to determine liveliness of peer controllers. Although the Mediator does not actively trigger switchover operations, it provides a vital function by allowing the surviving node to check its partner's status during network communication issues. In its role as a quorum witness, the Mediator provides an alternate path (effectively serving as a proxy) to the peer cluster.

Furthermore, the Mediator allows clusters to get this information as part of the quorum process. The Mediator 1290 utilizes the node management LIF and cluster management LIF for communication purposes. The Mediator 1290 establishes redundant connections through multiple paths to differentiate between site failure and InterSwitch Link (ISL) failure. When a cluster loses connection with the Mediator software and all its nodes due to an event, it is considered not reachable. This triggers an alert and enables automated failover to the mirror Consistency Group (CG) in the secondary site, ensuring uninterrupted I/O for the client. The replication data path relies on a heartbeat mechanism, and if a network glitch or event persists beyond a certain period, it can result in heartbeat failures, causing the relationship to go out-of-sync. However, the presence of redundant paths, such as LIF failover to another port, can sustain the heartbeat and prevent such disruptions.

What is claimed is:

1. A computer-implemented method comprising:

establishing bi-directional synchronous replication between one or more members of a first consistency group (CG1) of a primary storage site and one or more members of a second consistency group (CG2) of a secondary storage site with each storage site having read/write access while maintaining zero recovery point objective (RPO) and Zero recovery time objective (RTO);

detecting a disruption in a data replication session from one or more members of the CG1 to one or more members of the CG2 due to a disaster event that causes the one or more members of the CG1 to be non-operational having OOS state and initiates transition of CG2 from a secondary role to a primary role for serving input/output (I/O) operations;

initiating, based on the one or more members of CG1 becoming operational, a consensus establishment request to be sent to a mediator agent of the primary storage site;

rejecting with the mediator agent the consensus establishment request; and initiating, with the primary storage site, an early trigger of a role flip process for primary and secondary roles in serving input/output (I/O) operations (Ops) in response to the rejection of the consensus establishment request to reduce an application I/O resumption time and for faster resumption of zero RPO.

2. The computer-implemented method of claim 1, further comprising:

generating and sending, with the primary storage site, a cross-cluster call for CG1 to the secondary storage site to initiate a resynchronization process between CG1 and CG2 for returning CG1 and CG2 to in sync state and for faster resumption of zero RPO.

3. The computer-implemented method of claim 2, wherein the resynchronization process ensures that the primary storage site does not independently transition from a primary role to a secondary role and proceeds with the role flip if the secondary storage site has transitioned to the primary role and this precaution prevents a scenario where both primary and secondary storage sites indicate a secondary role for serving I/O Ops.

4. The computer-implemented method of claim 1, further comprising:

sending a start resync call to a data plane of the secondary storage site.

5. The computer-implemented method of claim 4, further comprising:

sending with the data plane an upcall to a host of the secondary storage site to start the role flip process and resynchronization process.

6. The computer-implemented method of claim 5, further comprising:

sending a communication to a host of the primary storage site to flip replicated database (RDB) configuration information from source to destination for the primary storage site.

7. The computer-implemented method of claim 6, further comprising:

sending a communication to the data plane of the secondary storage site to seed a data plane cache with a flag to start resynchronization between CG1 and CG2; and starting the resynchronization process.

* * * * *